United States Patent [19]
Jaffré et al.

[11] Patent Number: 4,775,984
[45] Date of Patent: Oct. 4, 1988

[54] SYNCHRONOUS DIGITAL CABLE TRANSMISSION SYSTEM

[75] Inventors: Pierre Jaffré, Lannion; Bernard Le Mouel, Gouzabas; Jean-Francois Robin, Plounevez Moedec; Pierre Thepaut, Lannion, all of France

[73] Assignee: Alcatel Cit, Paris, France

[21] Appl. No.: 78,629

[22] Filed: Jul. 28, 1987

[30] Foreign Application Priority Data

Jul. 28, 1986 [FR] France ................... 86 1095

[51] Int. Cl.[4] ............................................. H04L 25/49
[52] U.S. Cl. ............................................. 375/17; 375/4; 375/37
[58] Field of Search ............ 375/4, 17, 37, 18, 20, 375/19; 370/97

[56] References Cited

U.S. PATENT DOCUMENTS

3,492,578  1/1970  Gerrish et al. ................... 375/18
4,087,642  5/1978  Jessop et al. ................... 375/17

FOREIGN PATENT DOCUMENTS

3312400  9/1984  Fed. Rep. of Germany .

OTHER PUBLICATIONS

IEEE Transactions on Communications, vol. COM-28, No. 8, Aug. 1980, pp. 1425-1430. IEEE, New York, US; T. Roste et al: "A 140Mbit/s Digital Transmission System for Coaxial Cable-Using Partial Response Class 1 Line Code with Quantized Feedback": p. 1425, right column, lines 20-47; p. 1426, right column, lines 28-36; p. 1427, left column, lines 25-26.

*Primary Examiner*—Robert L. Griffin
*Assistant Examiner*—Marianne Huseman
*Attorney, Agent, or Firm*—Sughrue, Mion, Zinn, Macpeak & Seas

[57] ABSTRACT

A synchronous digital cable transmission system comprises a transmitting terminal, intermediate regenerative repeaters and a receiving terminal. The transmitting terminal includes a data scrambler and a 6B/4T type binary-ternary line coder. The receiving terminal and the intermediate regenerated repeaters include a class 1 type n=2 partial response coding type receive signal shaping and filtering unit and a logic device for decrypting binary symbol superpositions resulting from the signal shaping and filtering processes. The receiving terminal also includes a 6B/4T binary-ternary decoder and a descrambler respectively compatible with the coder and the scrambler in the transmitting terminal.

1 Claim, 3 Drawing Sheets

SYNCHRONOUS DIGITAL CABLE TRANSMISSION SYSTEM

BACKGROUND OF THE INVENTION

1. Field of the Invention

The present invention relates to synchronous digital transmission at very high data rates using cables and repeaters.

2. Description of the Prior Art

This type of transmission usually employs a line signal with no DC or low-frequency components, these usually not being transmitted by the repeaters and reserved for remote power feed and remote supervisory purposes; the signal is made up a synchronous sequence of multivalent symbols following on from one another at the so-called modulation rate and meeting the criteria established by Nyquist for transmission without intersymbol interference. The synchronous sequence of multivalent symbols is obtained by employing low-pass filtering in accordance with the Nyquist criteria to shape the synchronous sequence of their levels which is a signal with no DC or low-frequency component resulting from a so-called line coding operation. The maximum length that may be assigned to the regeneration step, that is to say the distance that the symbols travel over the cable beyond which they can no longer be reliably recognized, depends on the attenuation per unit length of the cable which is in turn dependent on the modulation rate.

In attempting to increase the length of the regeneration step keeping the same digital data rate or to increase the digital data rate keeping the same regeneration step it is necessary to combat the attenuation due to the cable, to which problem there are three solutions: to increase the transmit level, that is to say the amplitude of the symbols at the output from each repeater, or to reduce the modulation rate by increasing the number of symbol levels, or to tolerate a controled amount of intersymbol interference.

The facility for increasing the transmit level is in fact somewhat limited because any increase in the transmit level is accompanied by an increase in the power dissipation in the repeaters and in non-linear phenomena causing crosstalk.

Increasing the number of symbol levels by the use of multilevel line coding degrades the signal-to-noise ratio on which the error rate is dependent and, more importantly, increases the complexity of the repeaters, which depends on the number of levels to be regenerated, as well as causing operating difficulties because of the sensitivity of these codes, increasing in proportion to the number of levels, to jitter and to variations in attenuation and phase due to the cable. In practise the number of levels is limited to three, ternary line codes being by far and away those most commonly used on high data rate digital transmission systems using cables and repeaters, and an attempt is merely made to reduce the modulation rate by reducing the redundancy of the binary-ternary line codes used while preserving minimal timing information, absence of DC and low-frequency components and an error checking facility. In this line of thinking it would seem that there is no possibility of development beyond the 6B/4T line code which, in the digital link described in the journal Commutation et Transmission No 2, 1984, pages 47 through 66, makes it possible to achieve a regeneration step of 4.5 km on a 2.6/9.5 mm coaxial cable with a data rate of 140 Mbit/s.

Tolerance of a controled degree of intersymbol interference is a characteristic of the partial response coding technique described in U.S. Pat. No. 3,388,330 in particular.

This technique, used to increase the data rate on a link, consists in modelling the passband of the transmission channel in such a way that the latter responds only partially during the duration of a symbol and features some degree of memory effect leading to linear superposition of symbols that can be decrypted. Response coding leads, like multilevel line coding, to degradation of the signal-to-noise ratio and entails decrypting of linear superposition of symbols at each repeater, but it is less sensitive to jitter and to phase variations due to the cable and does not increase the number of levels of the signal to be regenerated.

The partial response code is not used as such, as it is believed to increase the error rate, the decrypting of the linear superposition of symbols received relying on the values of symbols previously received. It is systematically associated with precoding as described in the aforementioned U.S. Pat. No. 3,388,330 and in U.S. Pat. No. 3,492,578, which makes it possible to decrypt linear superposition of symbols without any knowledge of the symbols received previously by making the level resulting from linear superposition correspond, on the transmit side, to the level of the symbols to transmit modulo N, where N is the number of possible symbol levels.

Precoding is a non-linear process, however, and has the disadvantage that it modifies the frequency spectrum of the sequence of symbols transmitted and makes it necessary to attempt suppression of DC and low-frequency components by the partial response coding process itself. This imposes the use of a class 4 partial response system which is not the most advantageous from the point of view of sensitivity to jitter and to variations in attenuation and due to the cable phase.

An objective of the present invention is to provide a synchronous digital cable transmission system using repeaters having a longer regeneration step by virtue of a combination of the multilevel line coding and partial response coding techniques.

SUMMARY OF THE INVENTION

The present invention consists in a synchronous digital cable transmission system comprising a transmit terminal, intermediate regenerative repeaters and a receive terminal, a data scrambler and a 6B/4T type binary-ternary line coder in said transmit terminal, class 1 type $n=2$ partial response coding type receive line shaping and filtering means and logic means for decrypting binary symbol superpositions produced by signal shaping and filtering in said intermediate regenerative repeaters and said receiving terminal, and a 6B/4T binary-ternary decoder and a descrambler in said receive terminal compatible with said coder and said scrambler in said transmit terminal.

The combination of the class 1 type $n=2$ partial response coding technique with precoding and the 6B/4T line coding technique makes it possible to achieve a surprising improvement in transmission capacity. Applied to the 6B/4T line coding transmission system described in the previously mentioned article from the journal Commutation et Transmission, it enables the regeneration step to be increased for 4.5 km to more than 6.3 km using the same cable, the same data rate and the same noise margins.

Other characteristics and advantages of the invention will emerge from the following description of one embodiment thereof given by way of example only and with reference to the appended drawings.

DESCRIPTIOM OF THE PREFERRED EMBODIMENT

Figure 1:
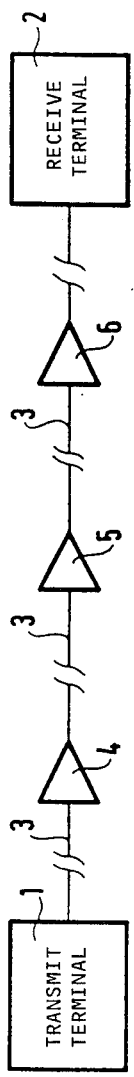
FIG. 1 shows the block diagram of a transmission system in accordance with the invention.

FIG. 1 shows the block diagram of the transmission system to be described, comprising a transmit terminal 1 and a receive terminal 2 connected by a transmission cable 3 equipped with intermediate repeaters 4, 5, 6.

The essential function of the transmit terminal is to convert the data to be transmitted into a synchronous stream of symbols matched to the transmission characteristics of the cable 3, that is to say with the lowest possible modulation rate consistent with retaining some degree of redundancy for detecting errors, with a frequency spectrum limited at high frequencies and including no DC or low-frequency components and with sufficient timing information to enable automatic synchronization of the equipment at the receiving end. It receives the data to be transmitted in the form of a synchronous bit stream (assumed to have a data rate of 140 Mbit/s for the remainder of this explanation) and its associated local clock signal and delivers to the line a signal at 93.9 Mbauds produced by scrambling and 6B/4T coding the data to be transmitted, inserts a line frame for synchronizing the scrambling which circumvents blocking and error multiplication problems at the scrambler and introduces order wires (service channels) providing various system operation facilities.

Figure 2:
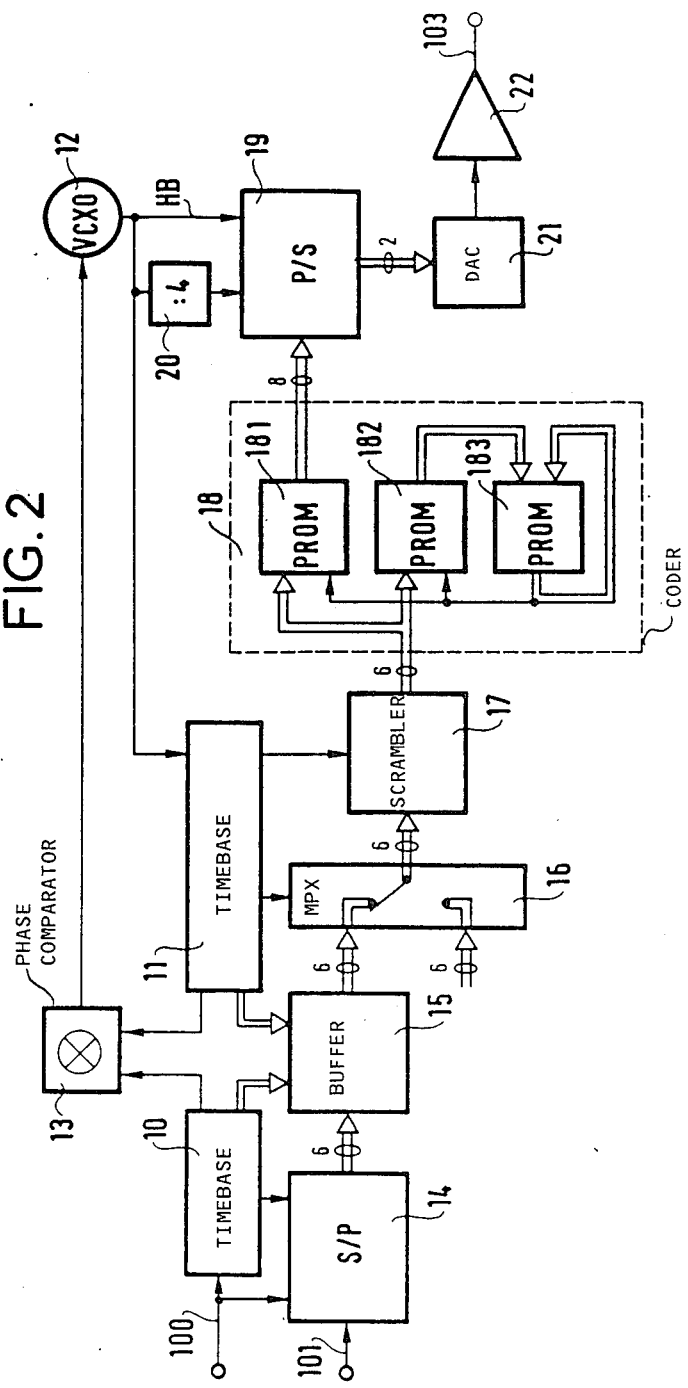
FIG. 2 shows the block diagram of the transmit terminal of the transmission system shown in FIG. 1.

FIG. 2 shows the block diagram of the transmit terminal. It comprises two timebases 10 and 11 producing various timing signals needed for shaping the signals transmitted. The first timebase 10 is driven by the local clock signal associated with the synchronous bit stream at 140 Mbit/s to be transmitted and available on an input 100. The second timebase 11 is driven by a voltage-controled quartz crystal oscillator (VCXO) 12 delivering a clock signal HB at the Baud frequency 93.9 MHz. By frequency division and cycle selection the two timebases 10 and 11 provide two sub-harmonics of the same frequency applied to a phase comparator 13 which locks the frequency of the oscillator 12 in a fixed ratio to the frequency of the local clock signal available on the input 100.

At the input of the transmit terminal is a serial-parallel converter (S/P) 14 driven by the first timebase 10 and dividing the synchronous bit stream to be transmitted into consecutive blocks of six. This serial-parallel converter 14, which is of conventional design, may be formed by a six-stage shift register with serial data input and parallel data output followed by another six-stage register with parallel data input and output. The shift register than has its serial data input connected to an input 101 of the transmit terminal to which the synchronous bit stream to be transmitted is applied and is clocked by the local clock signal available at the input 100 while the other register buffers the outputs from the first and is clocked by a first clock signal of the block generated by the first timebase 10 as a result of dividing the local clock signal frequency by six.

The consecutive blocks of six bits delivered in parallel by the serial-parallel converter 14 are applied to a buffer 15 which carries out the timing change necessary for insertion of frame alignment words and order wire bits. Having a capacity of four binary words each on six digits, it is addressed cyclically in write mode by the first timebase 10 at a regular addressing rate corresponding to that of the blocks delivered by the serial-parallel converter 14 and in read mode by the second timebase 11 at an irregular addressing rate resulting from selection of pulses at the Baud frequency from the oscillator 10 corresponding to block locations in the frame.

The blocks of six consecutive bits read out from the buffer 15 then pass through a multiplexer (MPX) 16 in which they are time-division multiplexed with other, less frequent blocks of six bits constituting the order wire bits. The multiplexer 16 has two six-bit parallel inputs and one six-bit parallel output and is controled by the second timebase 11 in such a way as to address the buffer 15 outside the order wire locations in the frame.

The sequence of blocks of six consecutive bits available at the output from the multiplexer 16 is applied to a synchronous scrambler 17 initialized at the start of each frame by the second timebase 11, its always identical sequence start formed by an integer number of blocks constituting a frame alignment word and being inserted into a time interval left free in the sequence of data blocks delivered by the multiplexer 16. The synchronous scrambler scrambles the data to be transmitted in such a way as to guarantee the bit sequences are independent of the transmission channel and to achieve equal probability at the receiving end for the various forms of symbol superposition permitted by the partial response coding technique which, as will be explained later, makes it possible to minimize the possibility of propagation of decrypting errors. The descrambler will not be described in detail here as it is of conventional design and may, for example, conform to CCITT Recommendation G.954.

The synchronous stream of blocks of six bits from the scrambler 17 is directed to a coder 18 which converts each block into a word made up of four ternary elements each available in the form of two-digit binary elements. This conversion is achieved by applying a known, so-called 6B/4T block coding law to generate a line signal that is particularly well suited to cable transmission with complete regeneration at the intermediate repeaters by reducing the line data rate by a factor in the order of $\frac{2}{3}$, the absence of DC and low-frequency spectrum components, sufficient redundancy for error checking and good definition of the timing. A so-called 6B/4T block coding law is defined by a correspondence table assigning to each specific value of a block of six bits a specific value of a word made up of four ternary elements with a digital total 0 or ±1 or the complemented or non-complemented version of a word on four ternary elements with digital total ±2 chosen to bring down towards 0 the running digital total of the signal transmitted over the line. Examples of tables defining such coding laws appear in contribution No 60 to CCITT design committee XVIII for the period 1977-1980 and in an article by J. Valin entitled "Codes d' impulsions pour transmission d' informations binaires" ("Pulse codes for binary information transmission") that appeared in the Thomson-C.S.F. technical review, volume 11, No 2, June 1979.

This coding law is applied by means of three programmable read only memories (PROM):

a first PROM 181 which is addressed by the blocks of six binary digits from the scrambler 17 and by a running digital total polarity signal obtained by reading a third PROM 183, the PROM 181 storing the code definition table and the values of each ternary element in this being written in the form of two binary digits;

a second PROM 182 addressed in the same way as the first and storing in binary form the values of the digital total of each ternary word resulting from the coding process; and the third PROM 183 already mentioned, wired as an accumulator, addressed by the second PROM 182 and loopback fashion by itself, this PROM calculating the running digital total and supplying for the purpose of addressing the other two PROMs 181 and 182 a polarity signal for this total used to choose the complemented version of the non-complemented version or the ternary word when this choice applies.

The sequence of ternary words read in binary on eight digits (two per ternary element) in the first PROM 181 of the coder 18 is applied to a parallel-serial converter (P/S) 19 which delivers on two binary digits the synchronous stream of ternary elements resulting from the coding process. The parallel-serial converter 19 may be formed by two shift registers each of four stages with parallel data input and serial data output each processing one digit of the ternary elements and both having their parallel loading control input connected to receive pulses at the word frequency 23.485 MHz derived from the signal from the oscillator 12 at the Baud frequency 93.943 MHz by a frequency divider (:4) 20 and both clocked by the signal from the oscillator 12 at the Baud frequency.

The synchronous stream of ternary elements available on two binary digits at the output from the parallel-serial converter 19 is applied to a digital-to-analog converter (DAC) 21 which restores its three levels (0 and ±1) and then to a transmit amplifier 22 which delivers the line signal on its output 103.

Figure 3:
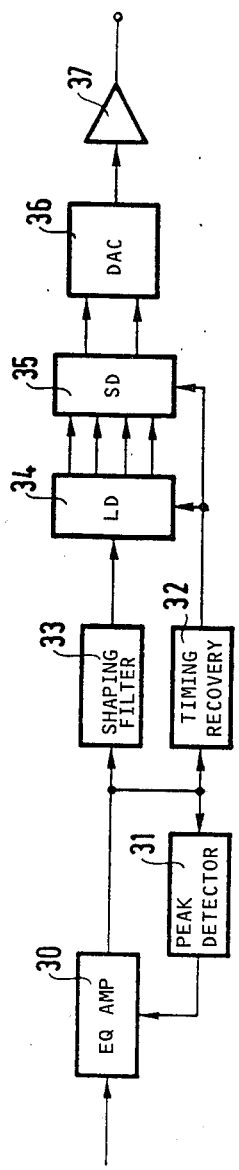
FIG. 3 shows the block diagram of a regenerative repeater of the transmission system shown in FIG. 1.

FIG. 3 shows the block diagram of a regenerative repeater which completely regenerates the line signal after it has passed through a length of cable equal to the regeneration step. At the input of the regenerative repeater is an equalizer amplifier 30 which compensates for the distortion and the $\sqrt{f}$ attenuation due to the cable so as to secure a low frequency response and a linear phase response up to frequency near the Baud half-frequency fn. Of conventional design, it comprises a fixed equalization part with passive filter circuits and an aperiodic amplifier which compensates for the minimal length 5.8 km of the regeneration step for the 2.6/9.5 mm coaxial cable employed and a variable equalization part using Bode networks controlled by a peak detector 31 connected to the output of the equalizer amplifier 30 and automatically compensating for the additional cable length that applies to an overall limit of a maximum length of 6.8 km for the regeneration step.

The output signal from the equalizer amplifier 30 is applied to a timing recovery circuit 32 which recovers the Baud frequency of the signal transmitted over the line and also to a signal shaping filter 33 processing intersymbol interference in order to monitor same.

The timing recovery circuit 32 exploits the fact that any non-linear processing of the line signal produces a component in its frequency spectrum at the Baud frequency. Of conventional design, it functions by rectifying the signal from the equalizer amplifier 30 and filtering the signal thus obtained using a narrowband (quartz crystal, for example) filter centered on the Baud frequency 93.944 MHz and then amplifying the isolated frequency component and adjusting its phase so that is transitions coincide with the centers of the symbols received.

Unusually for this transmission method, the signal shaping filter 33 does not confer on the equalizer amplifier 30 and on the section of cable which links it to the transmit amplifier immediately on its upstream side in the transmission direction a frequency response of raised cosine form with a cut-off factor in the order of 0.7 meeting the first Nyquist criterion for eliminating interference between the symbols received, but is rather a filter with a cosine response of the kind employed in the class 1, n=2 partial response technique known from the previously mentioned U.S. Pat. No. 3,388,330, for example. It confers on the equalizer amplifier 30 and on the section of cable preceding it a frequency response in the form:

$$h(f) = \cos \pi f/2 fn$$

where fn is the Baud half-frequency. As compared with the usual raised cosine filter with a roll-off factor of 0.7 it provides effective limitation of the frequency band to the Baud half-frequency fn without it being necessary to exceed this half-frequency by a factor of 0.7 with gradual rolling off so that the sum of the amplitudes at two frequencies symmetrical to the Baud half-frequency remains constant. This makes it possible to minimize the noise band but results in a controled degree of linear superposition of two consecutive symbols resulting in the case of ternary symbols in reception of a signal having five levels and a consequent reduction in the signal-to-noise ratio of 2.1 dB. The advantages would not seem to outweigh the disadvantages, this signal shaping method not having been implemented in cable transmission links with intermediate repeaters. However, experiments have shown that it yields a surprising improvement in the signal-to-noise ratio, the reduction in thermal noise due to limitation of the passband more than compensating for the loss of sensitivity due to the change from a receive signal with three levels to one with five levels; in the example described, it improves the signal-to-noise ratio by approximately 20 dB and enables the nominal regeneration step to be lengthened from 4.5 to 6.3 km.

The signal delivered by the signal shaping filter 33 is applied to a level detector (LD) 34 driven by the timing recovery circuit 32 and is then decrypted by a superposition decrypting (SD) logic circuit 35 which reconstitutes the ternary symbols originally transmitted on two binary digits.

The level detector 34 comprises a set of four threshold comparators connected in parallel with their tripping thresholds evenly distributed between the five levels that the signal can take at the output of the signal shaping filter and buffer registers sampling the threshold comparator outputs at the center of the receive symbols, in other words at the center of the eye diagram, under the control of the Baud frequency timing recovery circuit 32.

Figure 4:
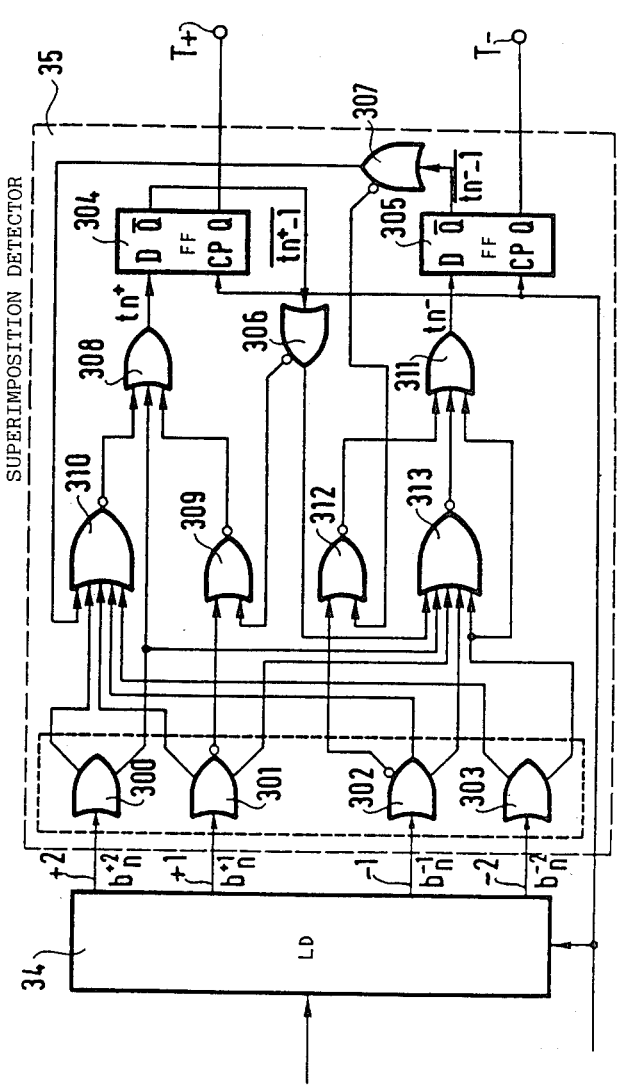
FIG. 4 shows the block diagram of a superposition decrypting logic circuit used in the regenerative repeater shown in FIG. 3.

As can be seen in FIG. 4, the level detector 34 has four binary outputs each corresponding to the sampled output of one of the comparators:

the +2 output which corresponds to that of the comparator whose threshold is between the levels +1 and +2 of the output signal from the signal shaping filter 33 and on which is available, after sampling during detection of a received signal Sn, a signal $b_n^{+2}$ with the logic value 1 or 0 according to whether the output signal from the signal shaping filter 33 was above the threshold of the comparator at the sampling time or not, the +1 output which corresponds to that of the comparator whose threshold is between the levels 0 and +1 of the output signal from the signal shaping filter 33 and on which is available, after sampling during detection of a received symbol Sn, a signal $b_n^{+1}$ having the logic value 1 or 0 depending on whether the output signal from the signal shaping filter 33 was above the threshold of the comparator at the sampling instant or not, the −1 output which corresponds to that of the comparator whose threshold is between the levels 0 and −1 of the output signals from the signal shaping filter 33 and on which is available, after sampling during detection of a received symbol Sn, a signal $b_n^{-1}$ having the logic value 0 or 1 according to whether the output signal from the signal shaping filter 33 was above the threshold of the comparator at the sampling instant or not, this comparator having an output signal that is complemented relative to those of the previous two comparators, and the −2 output which corresponds to that of the comparator whose threshold is between the levels −1 and −2 of the output signal from the signal shaping filter 33 and on which is available, after sampling during detection of a received symbol Sn, a signal $b_n^{-2}$ having the logic value 0 or 1 according to whether the output signal from the signal shaping filter 33 was above the threshold of the comparator at the sampling instant or not, this comparator, like the previous comparator, having an output signal which is complemented relative to those of the first two comparators.

The superposition decrypting logic circuit 35 identifies the ternary symbol sent either directly if the superposition generates the extreme levels ±2 which can only result from superposition of two ternary symbols of value +1 or respectively −1 sent in succession, or directly by taking into account the symbol previously decrypted if the superposition generates an intermediate level 0 or ±1. To this end it uses binary logic to code any ternary symbol on two binary digits available on binary outputs T+ and T− which are never at logic 1 at the same time, a logic 1 on the T+ output corresponding to a ternary symbol of value +1, a logic 1 on the T− output corresponding a ternary symbol of value −1 and a logic 0 on both outputs T+ and T− simultaneously corresponding to a ternary symbol of value 0.

As shown in FIG. 4, it comprises a set of four amplifiers 300, 301, 302 and 303 with inverting and non-inverting outputs distributing complemented and non-complemented versions of the binary signals $b_n^{+2}$, $b_n^{+1}$, $b_n^{-1}$, $b_n^{-2}$ delivered by the level detector 34 for each ternary symbol Sn received and two D type flip-flops 304 and 305 respectively memorizing the components $tn^+ - 1$ and $tn^- - 1$ of the ternary symbol Sn−1 previously received and decrypted as well as two amplifiers 306 and 307 with inverting and non-inverting outputs having their input connected to the $\overline{Q}$ outputs of the D type flip-flops 304 and 305 and providing the complemented and non-complemented versions of the components $Tn^+ - 1$ and $tn^- - 1$.

The D type flip-flops 304 and 305 memorizing the $t^+$ and $t^-$ components of the received ternary symbol receive the values of said components on their data inputs D, are written under the control of the timing recovery circuit 32 and have their Q output connected to the T+ and T− outputs of the decrypting logic circuit.

The component $tn^+$ whose logic value 1 characterizes a ternary symbol Sn received and decrypted of value +1 comes from an OR gate 308 with three inputs corresponding to the different linear superposition situations that can result from transmission of a ternary symbol Sn of value +1.

A first input of the OR gate 308 is connected direct to the output of the amplifier 300. It serves to apply the signal $b_n^{+2}$ when it is at logic 1 as the signal $tn^+$ because a superposition level of +2 at the receiving end can only have been caused by the transmission of two consecutive ternary symbols of value +1.

A second input of the OR gate 308 is connected to the inverting outputs of the amplifers 301 and 306 by a two-input NOR gate 309. This serves to impose on the signal $tn^+$ a level of logic 1 originating from the signal $b_n^{+1}$ when the signal $tn^+ - 1$ is at logic 0 because a superposition level of +1 or higher at the receiving end can only have been caused by the transmission of a ternary symbol Sn of value +1 in the case where the ternary symbol previously decrypted Sn−1 did not have the value +1 ($tn^+ - 1$ at logic 0).

A third input of the OR gate 308 is connected to the non-inverting outputs of the amplifiers 300, 301, 302, 303 and 307 through a five-input NOR gate 310. It serves to impose on the signal $Tn^+$ a level of logic 1 originating from the signal $tn^- - 1$ when all of the signals bn are at logic 0 indicating reception of a superposition level 0 because a superposition level 0 can only have been caused by the transmission of a ternary symbol Sn having the value +1 in the case where the ternary symbol previously decrypted Sn−1 had the value −1 ($tn^- - 1$ at logic 1).

All these cases are represented by the following logic equation defining the component $tn^+$:

$$tn^+ = b_n^{+2} + b_n^{+1} \cdot \overline{tn^+ - 1} + \overline{b_n^{+2}} \cdot \overline{b_n^{+1}} \cdot \overline{b_n^{-1}} \cdot \overline{b_n^{-2}} \cdot tn^- - 1$$

The component $tn^-$ which at logic 1 characterizes a decrypted ternary symbol of value −1 is obtained in much the same way as the component $tn^+$. It is formed by a three-input OR gate 311 associated with the various linear superposition situations that can arise from transmission of a ternary symbol Sn of value −1.

A first input of the OR gate 311 is connected direct to the output of the amplifier 303. It serves to apply the signal $b_n^{-2}$ when it is at logic 1 as the signal $tn^-$ because a superposition level of −2 at the receiving end can only have been caused by the transmission of two consecutive ternary symbols of value −1.

A second input of the OR gate 311 is connected to the inverting outputs of the amplifiers 302 and 307 by a two-input NOR gate 312. This serves to impose on the signal $tn^-$ a level of logic 1 originating from the signal $b_n^{-1}$ when the signal $tn^- - 1$ is at logic 0 because a superposition level of −1 or below at the receiving end can only have been caused by the transmission of a ternary symbol Sn of value −1 in the case where the ternary symbol previously decrypted Sn−1 did not have the value −1.

A third input of the OR gate 311 is connected to the non-inverting outputs of the amplifiers 300, 301, 302, 303 and 306 by a five-input NOR gate 313. This serves to impose on the signal $tn^-$ a level of logic 1 originating from the signal $tn^+-1$ when all of the signals bn are at logic 0 reflecting at the receiving end a superposition level equal to 0 because this superposition level can only have been caused by the transmission of a ternary symbol of value −1 in the case where the ternary symbol previously decrypted Sn−1 had the value +1 ($tn^+-1$ at logic 1).

All these cases are represented by the following logic equation defining the component $tn^+$:

$$tn^- = b_n^{-2} + b_n^{-1}. tn^- - 1 + b_n^{+2} . b_n^{+1}.$$
$$b_n^{-1}.b_n^{-1}. b_n^{-2}. tn^+ - 1$$

This decrypting method minimizes the propagation of errors. This is entirely prevented for the two extreme superposition levels ±2. Also, a correction is applied in the erroneous situation where the superposition level is respectively +1 or −1 when the previous ternary symbol was decrypted with the respective value −1 and +1.

It should be noted that the resulting decrypting circuit is very fast, the signals having to pass through at most three layers of logic gates.

The components $tn^+$ and $tn^-$ of the ternary symbols supplied in parallel by the decrypting logic circuit 35 just described are applied to a digital-to-analog converter 36 which returns the symbols to their initial ternary form and which may comprise, for example, a differential amplifier receiving the component $tn^+$ on its non-inverting input and the component $tn^-$ on its inverting input, and from this converter to the line amplifier 37 which provides sufficient output power for application to the transmission cable.

Figure 5:
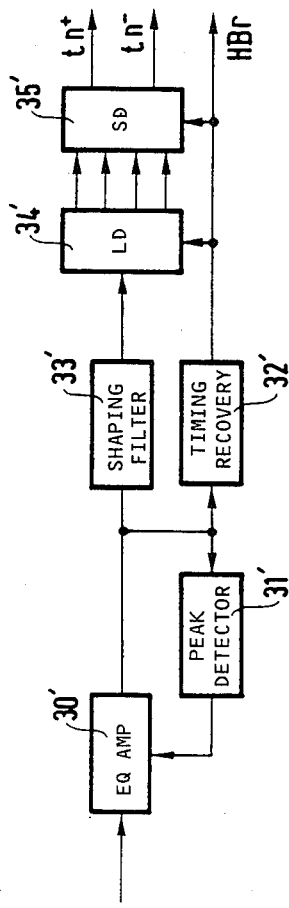
FIGS. 5 and 6 show block diagrams of a receive terminal of the transmission system shown in FIG. 1.
Figure 6:
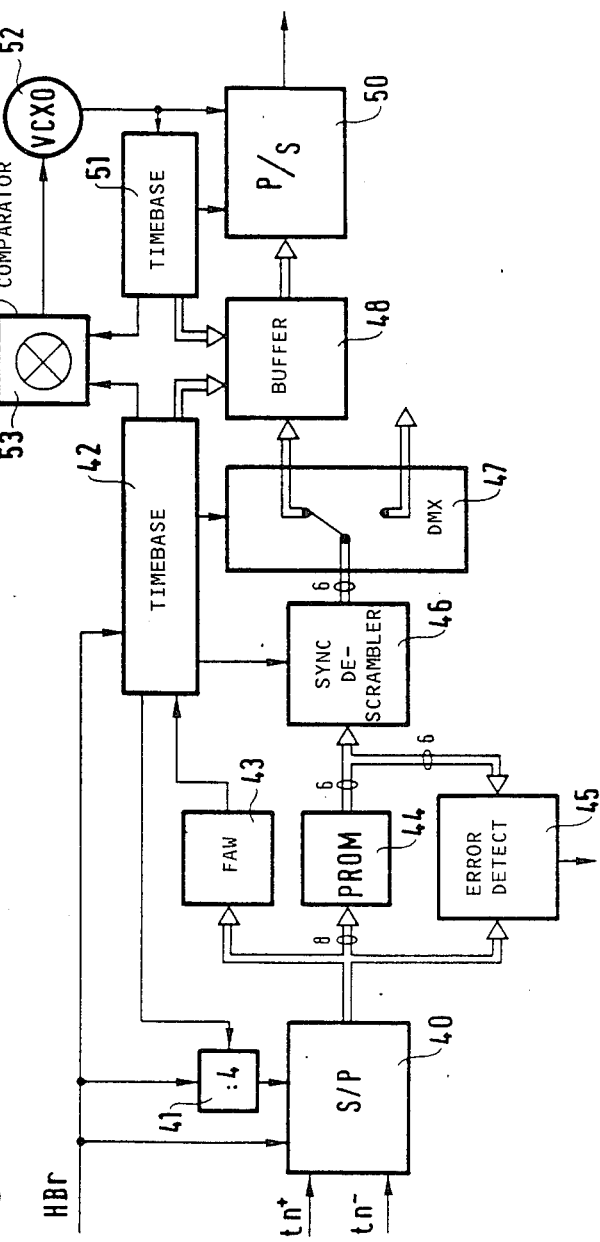

The line signal, completely regenerated in each regenerative repeater reaches, at the end of the link, the receive terminal whose block diagram is shown in FIG. 5, which shows the input equipment regenerating the ternary symbols, and in FIG. 6, which shows the equipment extracting from the regenerated ternary symbols the binary data stream transmitted from the transmit terminal.

The input equipments of the receive terminal shown in FIG. 5 are identical to those of a regenerative repeater and carry the same reference numbers primed. The input signal from the cable is fed to an equalizer amplifier 30' which is automatically adjusted to the length of the cable section on the upstream side under the control of a peak detector 31' connected to its output and then simultaneously to a Baud timing recovery circuit 32' delivering the recovered Baud clock signal HBr and to a signal shaping filter 33' with a cosine response feeding a level detector circuit 34' and a superposition decrypting logic circut 35' timed by the timing recovery circuit 32'.

As shown in FIG. 6, the two binary components $tn^+$ and $tn^-$ of the symbols provided by the decrypting logic circuit 35' and the Baud clock signal HBr are applied to a serial-parallel converter (S/T) 40 which recovers the subdivision of the stream of symbols into words each of four bits resulting from the 6B/4T coding process applied at the transmitting end. This serial-parallel converter has two identical parts, one for each of the symbol components $tn^+$ and $tn^-$, and each comprising a shift register with serial data input and parallel data outputs followed by a buffer register with parallel data inputs and outputs. The two registers have a number of stages greater than or equal to four and to the number of symbols in a frame alignment word. They are clocked by the recovered Baud clock signal HBr, the first directly and the second through the intermediary of a divider by 4 (:4) 41 provided with a phase shift controler controled by a first timebase 42 driven by the recovered Baud clock signal HBr.

The word or each of the consecutive words comprising four ternary symbols delivered in parallel, each on eight binary bits, by the serial-parallel converter 40 is applied to a frame alignment word recognition circuit (FAW) 43, to a 6B/4T type decoder (from) 44 and to an error detection circuit 45.

The frame alignment word recognition circuit 43, which may be a simple identity comparator, generates an identification pulse which is input to the first timebase 42 each time that it recognises the configuration of a frame alignment word at the output of the serial-parallel converter.

By divider down and selecting cycles from the recovered timing signal HBr, the first timebase 42 produces frame alignment word timing pulses, compares the times at which these occur with those of the identification pulses generated by the frame alignment word recognition circuit 43 and executes cycle skips corresponding to one word period until simultaneity is achieved. Should this prove impossible, it sends a phase shifting command to the frequency divider 41 in order to correct the breakdown into words.

The 6B/4T type decoder 44 is a programmable read-only memory addressed by the output signals of the first four stages of the serial-parallel converter 40 and storing the code definition table. It provides at its output blocks of six binary digits.

The error detection circut 45 is a 6B/4T coder similar to that in the transmit terminal which recodes the binary block from the decoder 44 and compares it with the coded word applied to the input of the decoder 44 in order to generate an error signal if the two are not coincident.

The blocks of six binary digits from the decoder 44 are then applied to a synchronous descrambler 46 which corresponds to the synchronous scrambler in the transmit terminal and which is initialized by periodic pulses marking the frame starts and delivered by the first timebase 42.

The stream of blocks of six binary digits delivered by the synchronous descrambler 46 is fed to a demultiplexer (DMX) 47 to enable extraction of the order wire blocks and then to a buffer 48 to enable time-division demultiplexing of the blocks corresponding to the data transmitted and to a parallel-serial converter (P/S) 50 restoring the data in its initial form of a synchronous bit stream at 140 Mbit/s.

The demultiplexer 47 has a six-digit parallel input and two six-digit parallel outputs one of which is the order wire blocks output. It is addressed by the first timebase 42 in such a way as to direct the binary blocks delivered by the descrambler 46 to the buffer 48 outside order wire locations in the frame.

The role of the buffer 48 is reciprocal to that of the buffer 15 in the transmit terminal. It carries out the timing change that is needed to re-establish synchronism after extraction of the order wire blocks and of the frame alignment word. Having a capacity of four words each of six binary digits, it is cyclically addressed in write mode by the first timebase 42 at an irregular addressing rate corresponding to the locations in the frame of the blocks corresponding to data and, in read mode, by a second timebase 51 at a regular addressing rate which is one sixth of the binary data rate of 140 Mbit/s.

The second timebase 51 is driven by a voltage-controlled quartz crystal oscillator (VCXO) 52 delivering a bit clock signal at 140 Mbit/s held in a constant frequency ratio to the recovered Baud clock signal HBr by a control loop including a phase comparator 53 receiving two signals at the same frequency, one of which is a sub-harmonic of the recovered Baud clock signal HBr and is generated by the first timebase 42 and the other of which is a sub-harmonic of the bit clock signal and is generated by the second timebase 51.

The parallel-serial converter 50 at the output of the receive terminal comprises a six-stage shift register with parallel data inputs and serial data output loaded in parallel at the block frequency delivered by the second timebase 51 and derived by dividing down by six the frequency from the VCXO oscillator 52 and unloaded serially at the bit frequency delivered directly by the VCXO oscillator 52.

Certain arrangements as described can be modified and certain devices as described can be replaced by equivalent devices without departing from the scope of the invention.

There is claimed:

1. Synchronous digital cable transmission system comprising in order and in series, a transmit terminal, intermediate connected in order and in series, for transmitting, regenerating and receiving data signals, respectively, said transmit terminal comprising, a data scrambler inputting to a 6B/4T type binary-ternary line coder said intermediate regenerative repeaters and said receive terminal comprising a, class 1 type n=2 partial response coding type receive line shaping and filtering means out inputting to a logic means for decrypting binary symbol superpositions produced by signal shaping and filtering, and said receive inputting to terminal also comprising and a 6B/4T binary-ternary decoder receiving signals from said logic means of said receive terminal and inputting to a descrambler said 6B/4T decoder and said descrambler being compatible with said coder and said scrambler, respectively, in said transmit terminal.

* * * * *